United States Patent [19]

Clenet

[11] Patent Number: 4,805,720
[45] Date of Patent: Feb. 21, 1989

[54] VEHICLE DRIVETRAIN

[76] Inventor: Alain J-M Clenet, 1211 Harbor Hill Dr., Santa Barbara, Calif. 93109

[21] Appl. No.: 102,816

[22] Filed: Sep. 22, 1987

Related U.S. Application Data

[63] Continuation of Ser. No. 833,959, Feb. 27, 1986, abandoned.

[51] Int. Cl.$^4$ .......................................... B60K 17/348
[52] U.S. Cl. .................... 180/248; 180/70.1; 180/291
[58] Field of Search ............... 180/233, 248, 249, 250, 180/244, 70.1, 75.1, 291

[56] References Cited

U.S. PATENT DOCUMENTS

| | | | |
|---|---|---|---|
| 1,095,916 | 5/1914 | Nicholas | 180/233 |
| 1,129,643 | 2/1915 | Christensen | 180/244 |
| 1,240,551 | 9/1917 | Farrell | 180/248 |
| 1,735,984 | 11/1929 | Straussler | 180/233 |
| 1,886,668 | 11/1932 | Gabli | 180/248 |
| 1,932,786 | 10/1933 | Johnson | 180/233 |
| 2,065,767 | 12/1936 | Thompson | 180/233 |
| 2,136,692 | 11/1938 | Johnson | 180/233 |
| 2,871,724 | 2/1959 | Dence | 180/248 |
| 2,915,133 | 12/1959 | Kraus | 180/244 |
| 4,538,700 | 9/1985 | Suzuki | 180/248 |
| 4,605,087 | 8/1986 | Ashauer | 180/233 |
| 4,618,022 | 10/1986 | Hayashi | 180/249 |
| 4,671,136 | 6/1987 | Katayama | 180/249 |

Primary Examiner—David M. Mitchell
Assistant Examiner—Everett G. Diederiks, Jr.
Attorney, Agent, or Firm—Brooks & Kushman

[57] ABSTRACT

A vehicle (10) disclosed incorporates an improved drivetrain (18) for providing full time four wheel driving. The drivetrain (18) includes an engine (20) driving a transmission (22) including multiple gear paths (28) and a differential (30) located within a single oil bath (36) defined by a housing (34) of the transmission. Front and rear outputs (38,40) of the transmission (22) respectively drive front and rear axles (42,44) through associated front and rear differentials (46,48) to provide the full time four wheel driving. In the preferred construction, front and rear driveshafts (50,52) extend between the transmission outputs (33,40) and the front and rear differentials (46,48) to provide the driving. It is also possible for the transmission (22) to incorporate a viscous clutch (54) for limiting interaxle differential rotation in order to prevent one axle from spinning when one of its wheels loses traction. Best results are achieved when the front and rear axles (42,44) are supported for rotation about fixed axes with respect to a vehicle frame (56) and used in association with front and rear driving wheel suspensions (62, 64) in order to reduce the unsprung mass of the vehicle and thereby provide improved performance with adverse road conditions.

18 Claims, 3 Drawing Sheets

VEHICLE DRIVETRAIN

This is a continuation of co-pending application Ser. No. 833,959 filed on Feb. 27, 1986, now abandoned.

TECHNICAL FIELD

This invention relates to an improved vehicle drivetrain for providing full time four wheel driving.

BACKGROUND ART

It has been known for many years to provide four wheel vehicle driving such as disclosed by U.S. Pats. Nos. 1,095,916 to Nichols; 1,129,643 to Christensen; 1,735,984 to Straussler; 1,932,786 to Johnson; 2,065,767 to Thompson; 2,136,692 to Johnson; and 2,915,133 to Kraus. Such four wheel driving provides increased traction and thus the capability of better vehicle control in situations where two wheel driving does not provide adequate traction.

Conventional vehicle drivetrains for providing four wheel driving include a transfer case which has a housing separate from the vehicle transmission that is driven by the vehicle engine. This type of transfer case has an input driven by the output of the transmission and has a pair of outputs respectively connected to the front and rear axles. In part time four wheel driving, one output of the transfer case is continually connected to the associated axle to provide continuous driving while the other output is selectively connected and disconnected so as to thereby provide either two or four wheel driving of the vehicle. In full time four wheel driving, both outputs of the transfer case are continuously connected to the associated axles. With part time transfer cases, the front and rear wheel outputs are often locked with respect to each other such that use thereof during continual on the road driving is not possible due to torque buildup in the drivetrain between the front and rear axles as a result of the different paths of travel of the front and rear wheels. However, such locked four wheel driving is advantageously used in off the road conditions or other lower speed driving requiring high traction. With full time four wheel driving, an interaxle differential of the transfer case between the front and rear axles is often utilized to permit the front and rear axles to operate at different speeds as required by their different paths of travel. To prevent one axle from spinning when one of its wheels loses traction, it is also conventional to incorporate a viscous clutch with the differential of the transfer case such that the axles can rotate with respect to each other only at limited speeds so as to thereby insure continuous four wheel driving.

Front wheel driving of vehicles has increased to a dominant extent during the last ten years or so. Such front wheel driving is conventionally provided by a front engine that drives a combination transmission and axle normally referred to as a "transaxle". The engine and transaxle are conventionally located adjacent the front of the vehicle and advantageously provide increased front wheel loading that improves the driving traction of the front wheels driven by the transaxle. Multiple gear paths of the transaxle drive a differential thereof which is in the same oil bath as the gear paths, and axially aligned outputs of the differential respectively drive the left and right front wheels at a speed determined by the gear paths selected by the transmission through a conventional manual or automatic selection. Vehicle power plants including an engine and transaxle are relatively economical in addition to providing the traction and other advantages associated with front wheel driving.

DISCLOSURE OF INVENTION

As object of the present invention is to provide an improved vehicle drivetrain for providing full time four wheel driving. In carrying out this object, the vehicle drivetrain utilizes a transmission of the transaxle type normally used to drive the front wheels of a front axle and thereby provides economical and effective full time four wheel driving.

A vehicle incorporating the invention is of the conventional type having front and rear ends and an intermediate portion extending therebetween in a longitudinal direction. The drivetrain of the vehicle includes an engine mounted on the intermediate portion of the vehicle between its front and rear ends and having a plurality of cylinders spaced longitudinally along the length of the vehicle. A single transmission of the drivetrain is mounted on the vehicle and driven by the engine, and the transmission includes multiple gear paths for providing different speeds as well as having an interaxle differential selectively driven by each gear path. A housing of the transmission defines a single oil both in which the multiple gear paths and the interaxle differential are located. Front and rear outputs of the transmission are axially aligned with each other and are driven by the interaxle differential. Front and rear axles of the drivetrain are respectively supported by the front and rear ends of the vehicle with the engine and transmission located entirely between the axles. The front and rear axles include associated front and rear differentials respectively driven by the axially aligned front and rear outputs of the transmission to thereby provide the full time four wheel driving.

As mentioned above, the transmission of the drivetrain is of the type normally used as a transaxle to provide driving of the left and right front wheels and results in an economical, but nevertheless highly effective, full time four wheel drivetrain.

The drivetrain also includes front and rear drive shafts having first ends respectively driven by the axially aligned front and rear outputs of the transmission. The front and rear drive shafts also have second ends for respectively driving the front and rear differentials of the front and rear axles, which permits the engine and transmission to be located at a "midship" position at a location generally between the driver and front passenger seats of the vehicle. This location may vary forwardly and rearwardly as needed for vehicle packaging and/or balancing of weight.

As disclosed, the drivetrain may also include a viscous clutch between the front and rear differentials to thereby limit rotation between the axles such that there is no spinning of either the front or rear axle when one of the wheels loses traction.

The vehicle in which the invention is incorporated preferably includes a frame having front and rear ends on which the front and rear axles are respectively mounted for rotation about front and rear axles that are fixed with respect to the frame in order to thereby reduce the unsprung mass of the vehicle. Front and rear driving wheel suspensions are respectively supported by the front and rear ends of the frame and are respectively driven by the front and rear axles through the front and rear differentials to provide the full time four wheel driving. The preferred construction of the frame includes a pair of frame members extending longitudinally with respect to the vehicle in a laterally spaced relationship with respect to each other. Both the engine and the transmission as well as the front and rear differentials are preferably located between the pair of frame members at the intermediate location between the front and rear ends of the frame members. The engine of the drivetrain, as previously mentioned, is mounted longitudinally along the vehicle such that the outputs of the transmission face forwardly and rearwardly to permit ease in connection thereof with the front and rear differentials of the front and rear axles.

The objects, features, and advantages of the present invention are readily apparent from the following detailed description of the best mode for carrying out the invention when taken in connection with the accompanying drawings.

BEST MODES FOR CARRYING OUT THE INVENTION

Figure 1:
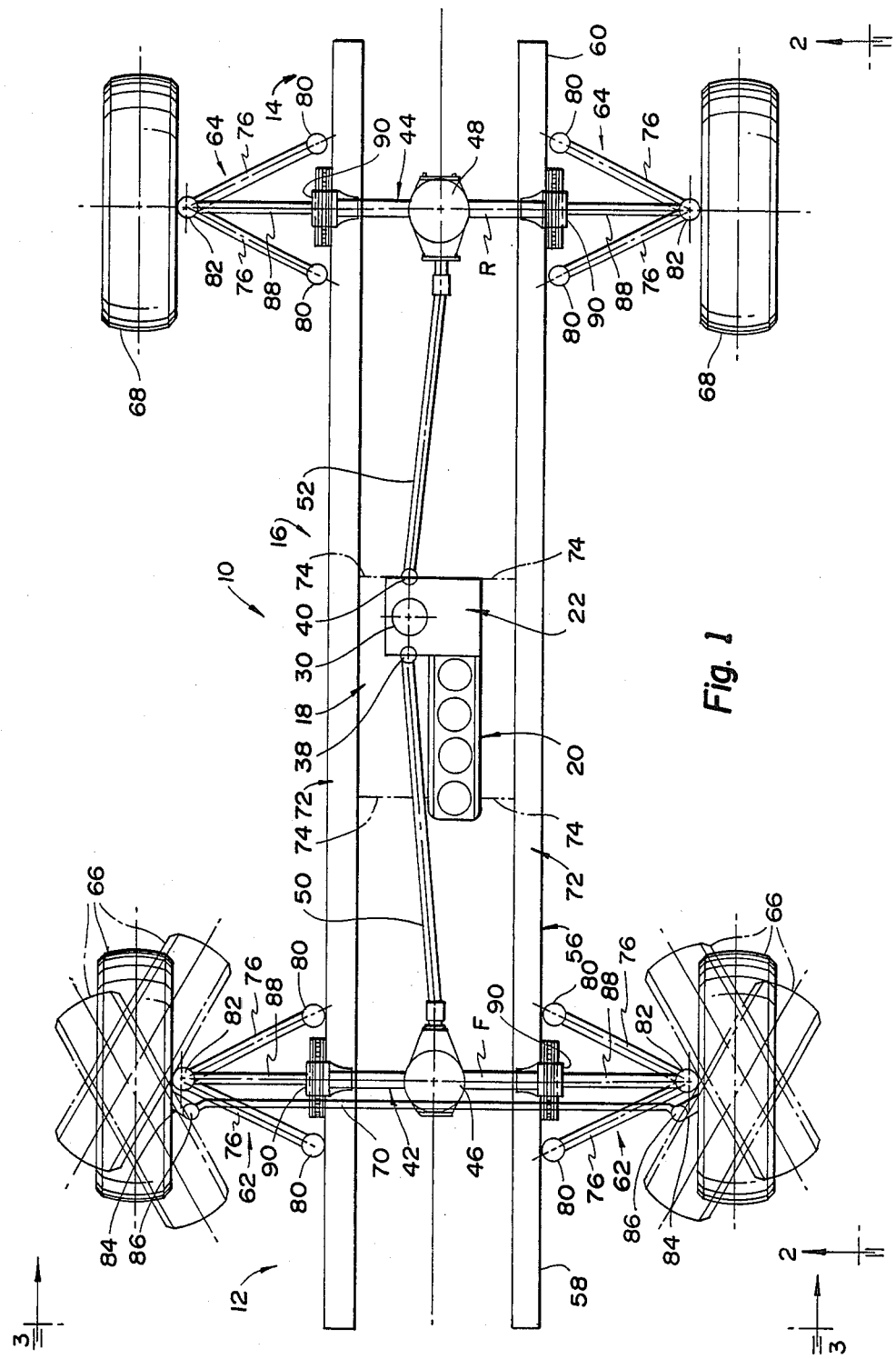
FIG. 1 is a top plan view illustrating a vehicle having a drivetrain constructed in accordance with the present invention.
Figure 2:
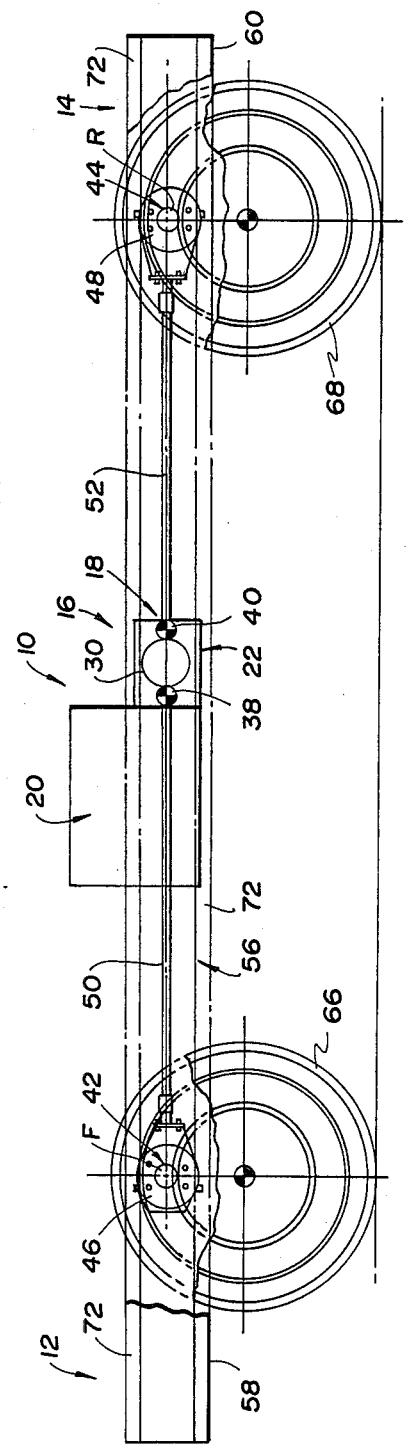
FIG. 2 is a partially broken away side view of the vehicle taken along the direction of line 2—2 of FIG. 1.

With reference to FIGS. 1 and 2 of the drawings, a schematically illustrated vehicle is generally indicated by 10 and has front and rear ends 12 and 14 as well as an intermediate portion 16 extending between its ends in a longitudinal direction. A drivetrain 18 of the vehicle is constructed in accordance with the present invention and includes an engine 20 mounted on the intermediate portion 16 of the vehicle, as is hereinafter more fully described, between the front and rear vehicle ends 12 and 14. A single transmission 22 of the drivetrain is mounted on the vehicle and driven by the engine 20.

Figure 4:
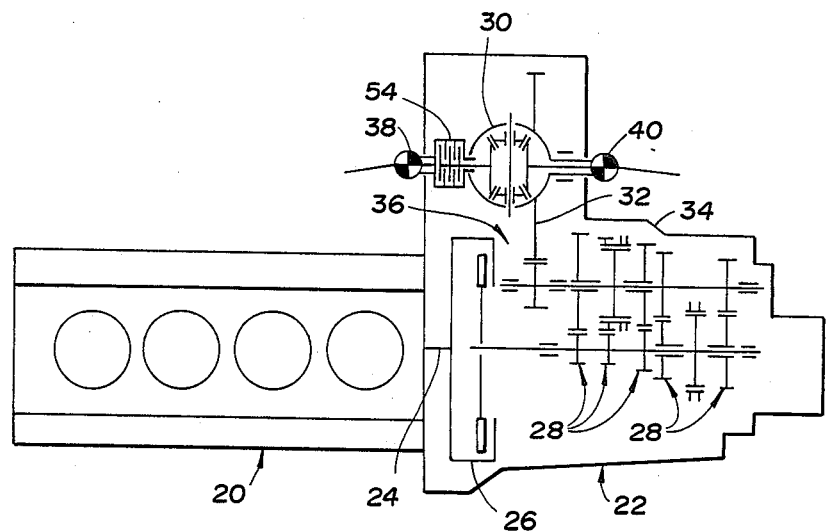
FIG. 4 is a schematic view illustrating an engine and a transmission of the vehicle drivetrain and is taken in the same direction illustrated in FIG. 1.

With reference to FIG. 4, the engine 20 includes a plurality of cylinders spaced longitudinally along the length of the vehicle and has an output 24 that drives a clutch 26 which functions as an input of the transmission 22. Multiple gear paths 28 of the transmission are selectively engaged through operation of the clutch 26 and a conventional selector mechanism to provide different speeds of driving in a conventional manner. It should be mentioned that the clutching may be of either the manual or automatic type as each is fully contemplated by the invention. An interaxle differential 30 of the transmission 22 has a gear input 32 that is selectively driven by each of the gear paths 28. Transmission 22 has a housing 34 that defines a single oil bath 36 in which the gear paths 28 and the differential 30 are located. Front and rear outputs 38 and 30 of the transmission 22 are axially aligned with each other and driven by the interaxle differential 30 during vehicle driving.

With reference back to FIGS. 1 and 2, front and rear axles 42 and 44 are respectively supported by the front and rear vehicle ends 12 and 14 in a manner that is hereinafter more fully described with the engine and transmission located entirely between the axles. Front and rear differentials 46 and 48 of the front and rear axles 42 and 44 are respectively driven by the axially aligned front and rear outputs 38 and 40 of the transmission 22 in a manner that is hereinafter more fully described to provide full time four wheel driving.

It should be appreciated that the type of transmission 22 utilized has previously been incorporated in front wheel vehicle drive systems as a transaxle which functions as both the transmission and front axle between the left and right front wheels. However, this type of transmission has not previously been utilized to provide driving of front and rear axles as part of a full time four wheel drivetrain in the manner herein disclosed. The use of the engine 20 and transmission 22 in the drivetrain 18 disclosed provides an economical power plant while still providing effective four wheel driving of the vehicle.

The drivetrain 18 also includes front and rear driveshafts 50 and 52 having first ends respectively driven by the axially aligned front and rear outputs 38 and 40 of the transmission 22. The front and rear drive shafts also have second ends for respectively driving the front and rear differentials 46 and 48 by the axially aligned front and rear outputs 38 and 40 of transmission 22. It will be noted that the transmission outputs 38 and 40 are laterally offset from the laterally centered differentials 46 and 48 and that universal joints are utilized at the opposite ends of the driveshafts 50 and 52 in order to accommodate this offset relationship. However, it is also possible to laterally offset the front and rear differentials 46 and 48 from their centered positions in order to eliminate the necessity for universal joints at the ends of drive shafts 50 and 52.

As illustrated in FIG. 4, the transmission 22 also includes a viscous clutch 54 which functions between the front and rear differentials 46 and 48 illustrated in FIG. 1. This viscous clutch limits relative rotation between the front and rear axles 42 and 44 and thereby prevents one axle from spinning when one of its wheels loses traction.

Figure 3:
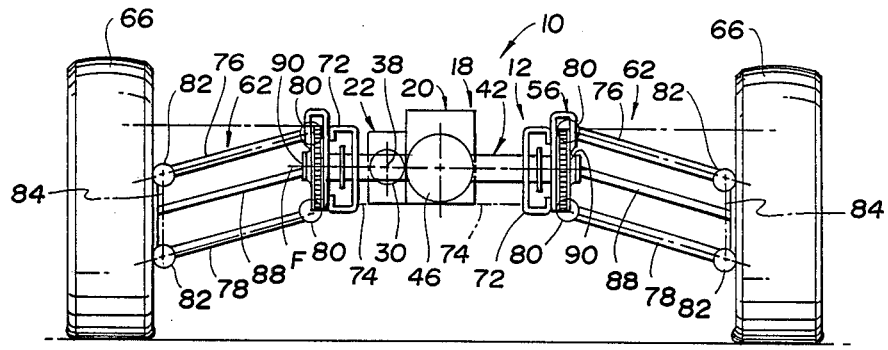
FIG. 3 is a front view of the vehicle taken along the direction of line 3—3 in FIG. 1.

As illustrated in FIGS. 1 through 3, the vehicle 10 includes a frame 56 having front and rear ends 58 and 60 on which the front and rear axles 42 and 44 are respectively mounted for rotation about front and rear axes F and R that are fixed with respect to the frame. Front and rear driving suspensions 62 and 64 of the drivetrain are respectively supported by the front and rear ends of the frame and are respectively driven by the front and rear axles through the front and rear differentials to provide the full time driving of the front wheels 66 and the rear wheels 68. As illustrated in FIG. 1, a conventional steering rod 70 extends between the pair of front wheels 66 and is actuated in any conventional manner to provide front wheel vehicle steering.

As illustrated in FIGS. 1 and 2, the frame 56 includes a pair of frame members 72 that are illustrated as having a generally straight construction with front and rear ends located adjacent the front and rear ends 58 and 60 of the frame. Frame members 72 have intermediate portions that extend between their front and rear ends and are illustrated as having generally U-shaped cross-sections that open horizontally in an outward direction away from each other as shown in FIG. 3. The frame members extend longitudinally with respect to the vehicle in a laterally spaced relationship that is illustrated in FIG. 1 as being parallel with respect to each other. The engine 20 and transmission 22 as well as the front and rear differentials 46 and 48 are located between the pair of frame members 72. Best packaging is achieved when the engine is mounted longitudinally along the vehicle such that its cylinders are spaced along a longitudinal vehicle axis as opposed to being spaced along a lateral vehicle axis. Any conventional type of mount as schematically illustrated at 74 may be utilized to provide the mounting of the engine 20 and transmission 22. It should be noted as illustrated in FIG. 2 that this four wheel drivetrain 18 supported on the frame members 72 does not project downwardly as far as conventional four wheel drivetrains due to the elimination of the normal transfer case. As such, increased road clearance is achieved. Specifically, both the engine and transmission have their lower extremities located at approximately the same elevation as the frame members 72 so as to thereby provide the increased ground clearance.

As illustrated by combined reference to FIGS. 1 and 3, each of the wheel suspensions 62 and 64 includes a pair of upper control arms 76 and a pair of lower control arms 78. Each pair of control arms 76 and 78 has inner ends mounted on the adjacent end of the adjacent frame member 72 by an associated joints 80 at longitudinally spaced locations forward and rearward of the associated axle end. From their inner joints 80, each pair of control arms 76 and 78 converge inwardly toward each other and have outer end joints 82 for providing support of the associated wheel. Each front wheel 66 includes a steering knuckle 84 connected to the associated pair of control arm joints 82 and has a joint 86 illustrated in FIG. 1 connected to the adjacent end of the steering rod 70 such that lateral positioning of the steering rod controls the front wheel sterring.

As shown best in FIGS. 3, each of the wheel suspensions as illustrated by the front wheel suspensions 62 includes a driveshaft 88 located between the associated pair of upper and lower control arms 76 and 78. An inner end of each driveshaft 88 is connected by a constant velocity universal joint 90 to the adjacent axle end, while the outer end of each driveshaft 88 is connected by a constant velocity universal joint to provide driving of the associated wheel.

It should be appreciated that the preferred construction of the drivetrain 18 as described above with the front and rear axles 42 and 44 fixed with respect to the frame reduces the unsprung mass of the vehicle and thereby provides improved performance of the four wheel driving when adverse road conditions are present.

While the best mode for carrying out the invention has been described in detail, those familiar with the art to which this invention relates will recognize various alternative designs and embodiments for carrying out the invention as defined by the following claims.

What is claimed is:

1. In a vehicle including front and rear ends and an intermediate portion extending therebetween, a drivetrain comprising: an engine mounted on the intermediate portion of the vehicle between the front and rear ends thereof and having a plurality of cylinders spaced longitudinally along the length of the vehicle; a single transmission that is mounted on the vehicle and driven by the engine; said transmission including multiple gear paths for providing different speeds and having an interaxle differential selectively driven by each gear path; the transmission also including a housing defining a single oil bath in which the multiple gear paths and interaxle differential are located; the transmission further including front and rear outputs that are axially aligned with each other extending generally longitudinally along the length of the vehicle; the front and rear outputs being driven by the interaxle differential; front and rear axles respectively supported by the front and rear ends of the vehicle with the engine and transmission located entirely between the axles; the front and rear axles including front and rear differentials; and front and rear drive shafts having first ends respectively driven by the axially aligned front and rear outputs of the transmission, and the front and rear drive shafts having second ends for respectively driving the front and rear differentials of the front and rear axles to provide full time four wheel driving.

2. A drivetrain as in claim 1 wherein the front and rear differentials of the front and rear axles are located centrally along the axles.

3. A drivetrain as in claim 1 further including a viscous clutch between the front and rear differentials.

4. A drivetrain as in claim 1, 2, or 3 wherein the vehicle includes a frame having front and rear ends on which the front and rear axles are respectively mounted for rotation about front and rear axes which are fixed with respect to the frame, front and rear driving wheel suspensions respectively supported by the front and rear ends of the frame, and the front and rear wheel suspensions having wheels respectively driven by the front and rear axles through the front and rear differentials.

5. A vehicle as in claim 4 wherein the frame includes a pair of frame members extending longitudinally with respect to the vehicle in a laterally spaced relationship with respect to each other.

6. A vehicle as in claim 5 wherein the engine and transmission as well as the front and rear differentials are located between the pair of frame members.

7. In a vehicle, the invention comprising: a frame including a pair of frame members extending longitudinally with respect to the vehicle in a laterally spaced relationship with respect to each other; each frame member having front and rear ends and an intermediate portion extending therebetween; a drivetrain including an engine mounted between the pair of frame members on the intermediate portions thereof between the front and rear ends of the frame members; the engine having a plurality of cylinders spaced longitudinally along the length of the vehicle; a single transmission that is also mounted between the pair of frame members on the intermediate portions thereof; said transmission being driven by the engine and including multiple gear paths for providing different speeds as well as having an interaxle differential selectively driven by each gear path; the transmission also including a housing defining a single oil bath in which the multiple gear paths and interaxle differential are located; the transmission further including front and rear outputs that are axially aligned with each other extending generally longitudinally along the length of the vehicle; the front and rear outputs being driven by the interaxle differential; front and rear axles respectively supported by the front and rear ends of the frame members with the engine and transmission located entirely between the axles; the front and rear axles including front and rear differentials respectively located between the front ends and the rear ends of the pair of frame members; front and rear drive shafts having first ends respectively driven by the axially aligned front and rear outputs of the transmission; the front and rear drive shafts having second ends for respectively driving the front and rear differentials of the front and rear axles; and front and rear driving wheel suspensions respectively mounted on the front and rear ends of the pair of frame members, and the front and rear wheel suspensions having wheels respectively driven by the front and rear differentials of the front and rear axles to provide full time four wheel driving.

8. In a vehicle, the invention comprising: a frame including a pair of frame members extending longitudinally with respect to the vehicle in a laterally spaced relationship with respect to each other; each frame member having front and rear ends and an intermediate portion extending therebetween; a drivetrain including an engine mounted between the pair of frame members on the intermediate portions thereof between the front and rear ends of the frame members; the engine having a plurality of cylinders spaced longitudinally along the length of the vehicle; a single transmission that is also mounted between the pair of frame members on the intermediate portions thereof; said transmission being driven by the engine and including multiple gear paths for providing different speeds as well as having an interaxle differential selectively driven by each gear path and including a viscous clutch; the transmission also including a housing defining a single oil bath in which the multiple gear paths and interaxle differential are located; the transmission further including front and rear outputs that are axially aligned with each other and driven by the interaxle differential; front and rear axles respectively supported by the front and rear ends of the frame members with the engine and transmission located entirely between the axles; the front and rear axles including front and rear differentials respectively located between the front ends and the rear ends of the pair of frame members; front and rear drive shafts having first ends respectively driven by the axially aligned front and rear outputs of the transmission and having second ends that respectively drive the front and rear differentials of the front and rear axles; and front and rear driving wheel suspensions respectively mounted on the front and rear ends of the pair of frame members, and the front and rear wheel suspensions having wheels respectively driven by the front and rear differentials of the front and rear axles to provide full time four wheel driving.

9. A vehicle as in claim 7 or 8 further including a viscous clutch between the front and rear differentials.

10. In a vehicle including front and rear ends and an intermediate portion extending therebetween, a drivetrain comprising: an engine mounted on the intermediate portion of the vehicle between the front and rear ends thereof and having a plurality of cylinders spaced longitudinally along the length of the vehicle; a single transmission that is mounted on the vehicle and driven by the engine; said transmission including multiple gear paths for providing different speeds and having an interaxle differential selectively driven by each gear path; the transmission also including a housing defining a single oil bath in which the multiple gear paths and interaxle differential are located; the transmission further including front and rear outputs that are axially aligned with each other extending generally longitudinally along the length of the vehicle; the front and rear outputs being driven by the interaxle differential; front and rear axles respectively supported by the front and rear ends of the vehicle and having front and rear axes that are located in a fixed relationship with respect to the vehicle; the engine and transmission being located entirely between the front and rear axles; the front and rear axles including front and rear differentials that are mounted in a fixed relationship with respect to the vehicle; front and rear drive shafts having first ends respectively driven by the axially aligned front and rear outputs of the transmission; the front and rear drive shafts having second ends for respectively driving the front and rear differentials of the front and rear axles; and front and rear suspensions respectively supported by the front and rear ends of the vehicle and having wheels respectively driven by the front and rear axles through the front and rear differentials to provide full time four wheel driving.

11. A drivetrain as in claim 10 wherein the front and rear differentials of the front and rear axles are located centrally along the axles.

12. A drivetrain as in claim 10 further including a viscous clutch between the front and rear differentials.

13. A drivetrain as in claim 10, 11, or 12 wherein the vehicle includes a frame having front and rear ends on which the front and rear axles are respectively mounted and having an intermediate portion on which the engine and transmission are mounted between the axles.

14. A vehicles as in claim 13 wherein the frame includes a pair of frame members extending longitudinally with respect to the vehicle in a laterally spaced relationship with respect to each other.

15. A vehicle as in claim 14 wherein the engine and transmission as well as the front and rear differentials are located between the pair of frame members.

16. In a vehicle, the invention comprising: a frame including a pair of frame members extending longitudinally with respect to the vehicle in a laterally spaced relationship with respect to each other; each frame member having front and rear ends and an intermediate portion extending therebetween; a drivetrain including an engine mounted between the pair of frame members on the intermediate portions thereof between the front and rear ends of the frame members; the engine having a plurality of cylinders spaced longitudinally along the length of the vehicle; a single transmission that is also mounted between the pair of frame members on the intermediate portions thereof; said transmission being driven by the engine and including multiple gear paths for providing different speeds as well as having an interaxle differential selectively driven by each gear path; the transmission also including a housing defining a single oil bath in which the multiple gear paths and interaxle differential are located; the transmission further including front and rear outputs that are axially aligned with each other extending generally longitudinally along the length of the vehicle; the front and rear outputs being driven by the interaxle differential; front and rear axles respectively supported by the front and rear ends of the frame members and having front and rear axes that are located in a fixed relationship with respect to the vehicle; the engine and transmission being located entirely between the front and rear engine axles; the front and rear axles including front and rear differentials respectively located between the front ends and the rear ends of the pair of frame members; front and rear drive shafts having first ends respectively driven by the axially aligned front and rear outputs of the transmission; the front and rear drive shafts having second ends for respectively driving the front and rear differentials of the front and rear axles; and front and rear driving wheel suspensions respectively mounted on the front and rear ends of the pair of frame members, and the front and rear wheel suspensions having wheels respectively driven by the front and rear differentials of the front and rear axles to provide full time four wheel driving.

17. In a vehicle, the invention comprising: a frame including a pair of frame members extending longitudinally with respect to the vehicle in a laterally spaced relationship with respect to each other; each frame member having front and rear ends and an intermediate portion extending therebetween; a drivetrain including an engine mounted between the pair of frame members on the intermediate portions thereof between the front and rear ends of the frame members; the engine having a plurality of cylinders spaced longitudinally along the length of the vehicle; a single transmission that is also mounted between the pair of frame members on the intermediate portions thereof; said transmission being driven by the engine and including multiple gear paths for providing different speeds as well as having an interaxle differential selectively driven by each gear path and including a viscous clutch; the transmission also including a housing defining a single oil bath in which the multiple gear paths and interaxle differential are located; the transmission further including front and rear outputs that are axially aligned with each other and driven by the interaxle differential; front and rear axles respectively supported by the front and rear ends of the frame members and having front and rear axes that are located in a fixed relationship with respect to the vehicle; the engine and transmission being located entirely between the front and rear axles; the front and rear axles including front and rear differentials respectively located between the front ends and the rear ends of the pair of frame members; front and rear drive shafts having first ends respectively driven by the axially aligned front and rear outputs of the transmission and having second ends that respectively drive the front and rear differentials of the front and rear axles; and front and rear driving wheel suspension respectively mounted on the front and rear ends of the pair of frame members, and the front and rear wheel suspensions having wheels respectively driven by the front and rear differentials of the front and rear axles to provide full time four wheel driving.

18. A vehicle as in claim 16 or 17 further including a viscous clutch between the front and rear differentials.

* * * * *

UNITED STATES PATENT AND TRADEMARK OFFICE
CERTIFICATE OF CORRECTION

PATENT NO. : 4,805,720

DATED : February 21, 1989

INVENTOR(S) : Alain J-M Clenet

It is certified that error appears in the above-identified patent and that said Letters Patent is hereby corrected as shown below:

Column 2, line 6, "As" should be --An--.

Column 2, line 25, "both" should be --bath--.

Column 3, line 24, after "2-2", "of" should be --in--.

Column 3, line 59, "30" should be --40--.

Column 5, line 30, "sterring" should be --steering--

Column 8, line 56, Claim 16, omit "engine".

Column 10, line 14, Claim 17, "suspension" should be --suspensions--.

Signed and Sealed this

Twenty-fifth Day of December, 1990

Attest:

HARRY F. MANBECK, JR.

Attesting Officer

Commissioner of Patents and Trademarks